(12) United States Patent
Shi et al.

(10) Patent No.: US 9,037,679 B2
(45) Date of Patent: May 19, 2015

(54) EFFICIENT HIGH AVAILABILITY STORAGE SYSTEMS

(71) Applicant: Futurewei Technologies, Inc., Plano, TX (US)

(72) Inventors: Guangyu Shi, Cupertino, CA (US); Xiangyang Xu, Shenzhen (CN); Zhi Li, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 199 days.

(21) Appl. No.: 13/902,343

(22) Filed: May 24, 2013

(65) Prior Publication Data

US 2014/0189053 A1    Jul. 3, 2014

Related U.S. Application Data

(60) Provisional application No. 61/747,747, filed on Dec. 31, 2012.

(51) Int. Cl.
  *G06F 17/00*  (2006.01)
  *G06F 15/16*  (2006.01)
  *H04L 29/14*  (2006.01)
  *H04L 29/08*  (2006.01)

(52) U.S. Cl.
  CPC ............ *H04L 67/10* (2013.01); *H04L 67/1097* (2013.01); *H04L 69/40* (2013.01); *H04L 67/108* (2013.01); *Y10S 707/99955* (2013.01)

(58) Field of Classification Search
  USPC .................. 709/217, 203, 219, 206, 231, 225
  See application file for complete search history.

(56) References Cited

U.S. PATENT DOCUMENTS

| | | | |
|---|---|---|---|
| 2004/0117442 A1* | 6/2004 | Thielen ......................... | 709/203 |
| 2005/0063217 A1 | 3/2005 | Shiraishi et al. | |
| 2005/0066230 A1 | 3/2005 | Bean et al. | |
| 2007/0198604 A1 | 8/2007 | Okada et al. | |
| 2007/0220311 A1 | 9/2007 | Lewin et al. | |
| 2008/0222062 A1* | 9/2008 | Liu et al. ......................... | 706/15 |
| 2008/0256418 A1* | 10/2008 | Luby et al. ..................... | 714/762 |
| 2008/0312760 A1* | 12/2008 | Lee et al. ......................... | 700/94 |
| 2009/0307284 A1* | 12/2009 | Welingkar et al. ............. | 707/204 |
| 2011/0065424 A1* | 3/2011 | Estevez et al. .............. | 455/414.3 |

OTHER PUBLICATIONS

Plank, J.S., et al., "Jerasure: A Library in C/C++ Facilitating Erasure Coding for Storage Applications," Version 1.2, Technical Report CS-08-627, University of Tennessee, Department of Electrical Engineering and Computer Science, 2008, Knoxville, Tennessee, pp. 1-39.

(Continued)

*Primary Examiner* — Jude Jean Gilles
(74) *Attorney, Agent, or Firm* — Conley Rose, P.C.; Grant Rodolph; Brandt D. Howell (57) ABSTRACT

A server configured to form part of a data protection group, wherein the server comprises a memory, a transceiver configured to receive a request to store a data file from another device, and a processor coupled to the memory and the transceiver and configured to acquire the request to store a data file, write the data file to a container in the memory, and encode the container contents when the container becomes full to generate a plurality of encoded blocks, wherein the transceiver is further configured to distribute the plurality of encoded blocks over peer servers in the data protection group.

20 Claims, 6 Drawing Sheets

(56) References Cited

OTHER PUBLICATIONS

DeCandia, G., et al., "Dynamo: Amazon's Highly Available Key-value Store," SOSP '07, Oct. 14-17, 2007, Stevenson, Washington, pp. 1-16.

Foreign Communication From a Counterpart Application, PCT Application No. PCT/CN2013/090939, International Search Report dated Mar. 13, 2014, 6 pages.

Foreign Communication From a Counterpart Application, PCT Application No. PCT/CN2013/090939, Written Opinion dated Mar. 13, 2014, 4 pages.

* cited by examiner

EFFICIENT HIGH AVAILABILITY STORAGE SYSTEMS

CROSS-REFERENCE TO RELATED APPLICATIONS

The present application claims priority to U.S. Provisional Patent Application No. 61/747,747 filed Dec. 31, 2012 by Guangyu Shi, et al. and entitled "A Method of Building Efficient Storage System with High Availability", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Data redundancy enables the availability of data in the circumstance that one or more storage nodes fail. Many enterprise storage systems (e.g., Network Attached Storage (NAS), Storage Area Network (SAN)) and cloud storage systems (e.g. Object Storage, Key Value Store) employ data redundancy mechanisms in order to provide fault tolerance. Data redundancy may be classified into two categories: replica based and erasure coding based. A classical three-replica approach keeps three copies for one data content and stores them into three storage nodes, which triples the cost. When this method is applied to a distributed storage system with, for example, 100 nodes, if more than two servers fail, there may be a high probability that some of the data will become unavailable.

Conventional erasure coding implementations in enterprise storage may include RAID (redundant array of independent disks), Reed-Solomon, and Cauchy Reed-Solomon erasure coding. Erasure coding uses the notation "N+M" to denote N data blocks and M redundancy blocks generated by the encoding of N data blocks. That is, N data blocks may be encoded to generate N+M total blocks. The extra cost of encoding may be defined as M/N. For example, an "8+2" coding implemented in a 100 node system may still have a certain probability for data unavailability.

It may be desirable to be able to run erasure coding at a much larger scale, such as an "80+20" coding using 100 servers. In this case, with 25% extra disk usage, the system may guarantee 100% data availability even if 20 of the 100 servers fail. A significant challenge in implementing such a system may be that the computing complexity increases linearly with the scale. Thus, there is a demand for the development of optimized software erasure coding/decoding calculation and parallel data recovery in order to outperform and improve upon the efficiency of conventional systems that are not sufficient for large-scale implementations.

SUMMARY

In one embodiment, the disclosure includes a server configured to form part of a data protection group, wherein the server comprises a memory, a transceiver configured to receive a request to store a data file from another device, and a processor coupled to the memory and the transceiver and configured to acquire the request to store a data file, write the data file to a container in the memory, and encode the container contents when the container becomes full to generate a plurality of encoded blocks, wherein the transceiver is further configured to distribute the plurality of encoded blocks over peer servers in the data protection group.

In another embodiment, the disclosure includes an apparatus comprising a memory configured to store a data block and a coding matrix for encoding the data block, a cache, and a processor coupled to the cache and the memory, wherein the processor is configured to determine a size of the coding matrix, determine a size of a submatrix of the data block such that the sum of the size of the coding matrix and the size of the submatrix is smaller than the size of the cache, request that the submatrix of the data block and the coding matrix be written to the cache from the memory, wherein the cache is configured to store the submatrix of the data block and the coding matrix, and compute a portion of an encoded block by selecting at least two rows of the submatrix of the data block and performing binary operations on the at least two rows, wherein the at least two rows are selected according to elements of the first submatrix of the coding matrix.

In yet another embodiment, the disclosure includes a server configured to form part of a data protection group, wherein the server comprises a transceiver configured to request a failed server's list of containers from at least one location node, and a processor coupled to the transceiver and configured to select a portion of the list of containers for recovery, wherein the transceiver is further configured to transmit a plurality of requests to a plurality of servers in the data protection group, and wherein the requests are collectively for all the coded blocks corresponding to a container in the portion of the list.

In yet another embodiment, the disclosure includes a method comprising generating a graph comprising a starting node and a plurality of nodes, where each of the plurality of nodes corresponds to a different row of a coding matrix used to encode data in a container, wherein an edge from the starting node to each node in the plurality of nodes is a number of ones of the corresponding row of the coding matrix, adding edges between all pairs of nodes in the plurality of nodes to the graph, wherein an edge from a first node to a second node in each pair of nodes in the plurality of nodes is the number of differences between the corresponding two rows of the coding matrix, determining the minimum spanning tree from the graph, and adjusting the coding matrix based on the minimum spanning tree.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems, methods, and apparatuses for building an efficient storage system with high availability. Architectures and mechanisms are presented for storing data and recovering lost data in data storage systems employing large groups of servers. Methods are proposed to optimize erasure coding and decoding calculations by utilizing a single instruction multiple data (SIMD) approach, a cache-friendly improvement, instruction level parallelism, and a minimum spanning tree based optimization. Additionally, a parallel data recovery mechanism may be implemented with a reduced recovery window length. An efficient matrix calculation may enable high performance software Cauchy Reed-Solomon erasure coding and decoding at an unprecedented scale (e.g., "80+20"). Large-scale erasure coding methods and associated architectures may achieve higher data availability with decreased cost.

Figure 1:
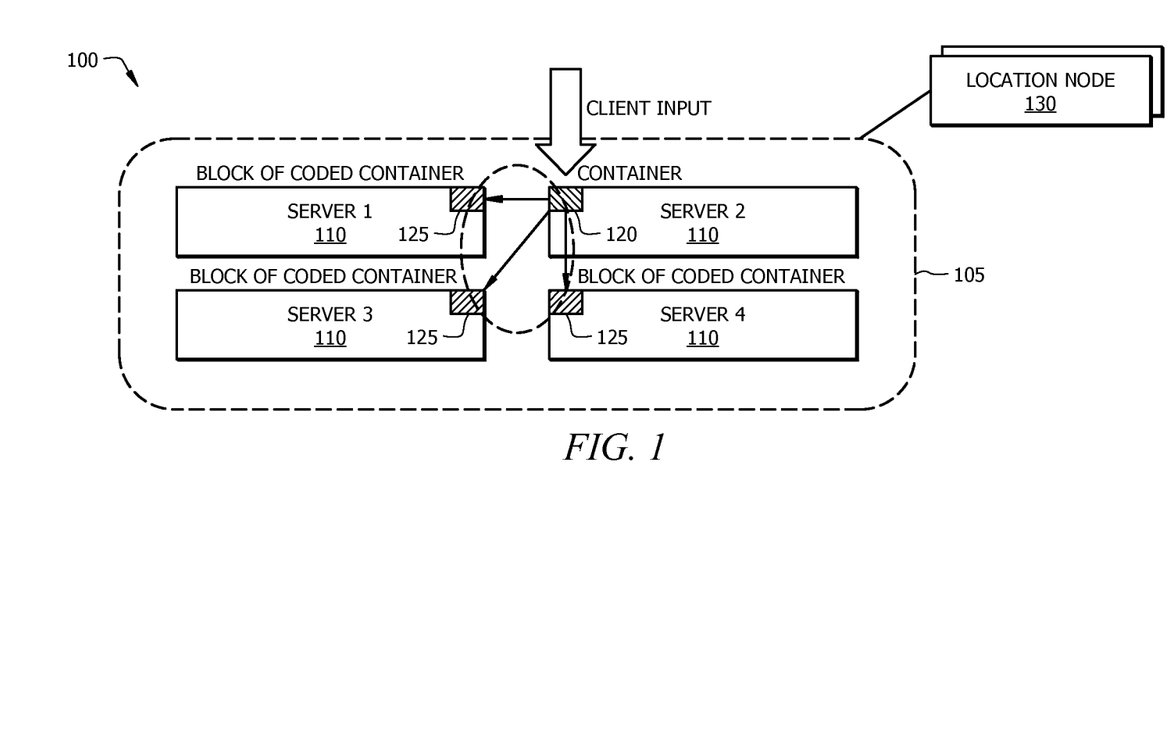
FIG. 1 is an embodiment of data protection group (DPG) architecture.

FIG. 1 is an embodiment of a data protection group (DPG) architecture 100 that employs erasure coding. The architecture 100 may comprise a plurality of storage servers 110, as well as at least one location node 130. The architecture 100 may be implemented in storage systems with data redundancy requirements (e.g., Network Attached Storage (NAS), object storage, and key value store). The four storage servers 110 may form a DPG 105 and store the backup of data. Although only four storage servers 110 are shown for illustrative purposes, any number of servers may be used in the system.

A container 120 may be some amount of storage (corresponding to an address space in memory) allocated by a server in a DPG 105 with a fixed size limit. The container 120 may store a plurality of files until it is full. Once the container 120 reaches its limit in data storage, the container 120 may be sealed and ready for erasure coding. The container 120 may be spread to coded blocks 125 and distributed among other servers in a DPG.

A location node 130 may store the identifiers (IDs) or addresses of the servers along with membership information. For example, all the servers with ID 1 to 100 may be stored in one DPG. This information may be found in a location node 130, which may be a centralized or distributed repository. A location node 130 may also hold mapping information of the containers and corresponding coded blocks in a DPG.

If a client wants to write a file into a storage system, a client request may arrive at one or more of the servers according to predefined protocols, including but not limited to random selection, random robin selection, and hash based load balancing selection. For instance, a request may arrive at storage Server2 110. The server may store the data stream into a corresponding container (e.g., container 120). Once the container has reached its limit, Server2 110 may seal container 120 and proceed with erasure coding. Server2 110 may run erasure coding, such as Cauchy Reed-Solomon erasure coding proposed herein, and subsequently distribute the coded blocks 125 to other peers in the same DPG (e.g. DPG 105). Server2 110 may use predefined rules or query a location node 130 to find other peers. After successfully spreading the coded blocks to other peers, Server2 110 may record the mapping of the coded container 120 to a location node 130. That is, Server2 110 may tell a location node 130 that it is responsible for container 120. The mapping may comprise a container ID and server ID pair sent to a location node.

By way of further example, a DPG may comprise 100 servers, each with a container size limit of 80 megabytes (MB). After using "80+20" coding on a container, the data may be divided into 1 MB blocks and distributed over 100 coded containers corresponding to the 100 servers, with, e.g., one block per server. The data in the container may be divided into 80 blocks, while the other 20 blocks may be a result of a redundancy checksum. The containers may be distributed among servers to maximize fault tolerance; however, in another embodiment, multiple containers may be stored on fewer servers.

Figure 2:
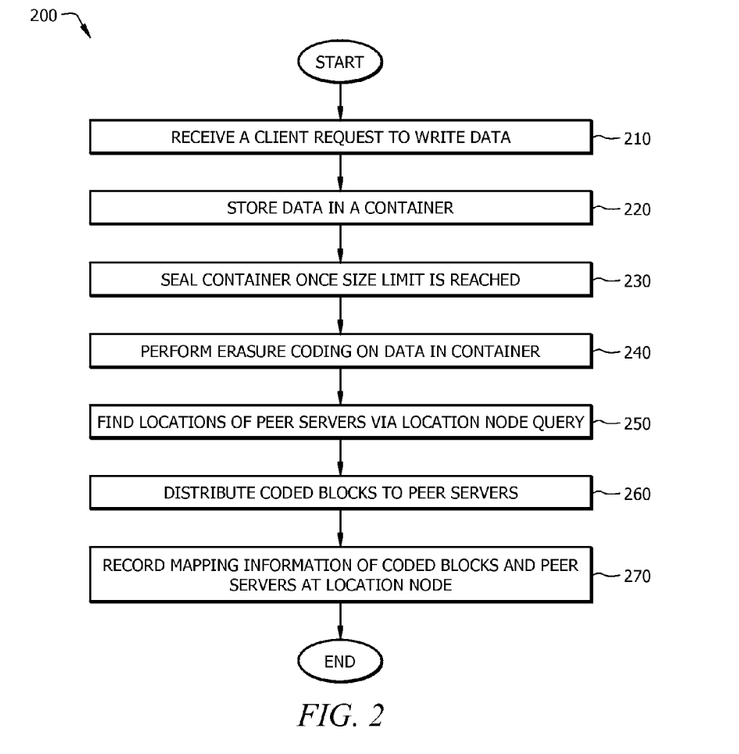
FIG. 2 is a flowchart of an embodiment of an erasure coding method.

FIG. 2 is a flowchart 200 of an embodiment of a method for running erasure coding. The steps of the flowchart 200 may be implemented in a data storage system with at least one DPG, a plurality of servers, and at least one location node, such as DPG 105 comprising servers 110 and location node 130. The flowchart begins in block 210, in which a server (e.g., Server2 110 in FIG. 1) may receive data from a client request. The specific server may be selected according to protocols known to a person of ordinary skill in the art (including but not limited to random selection, random robin selection, and hash based load balancing selection). Next in block 220, the server may store the obtained data in a corresponding container, such as container 120 in FIG. 1. Incoming data may be stored until the container is full. When the size limit of the container has been met, the method continues in block 230, in which the server may seal the container in preparation of erasure coding. At block 240, the server may run erasure coding, such as Cauchy Reed-Solomon erasure coding proposed herein, on the data stored in the container. After coding, the server may query a location node (such as location node 130) in block 250 in order to find other peer servers in the DPG. At block 260, the server may distribute the coded blocks (e.g. coded blocks 125) obtained from erasure coding to peer servers. The method ends at block 270, with the server recording the mapping information of the coded blocks and server locations (e.g., container ID and server ID pairs) to the location node.

Figure 3:
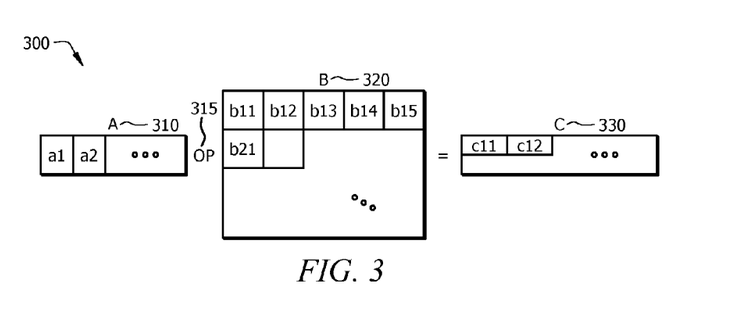
FIG. 3 is a schematic diagram of an embodiment of a Cauchy Reed-Solomon erasure coding matrix calculation.

FIG. 3 illustrates an embodiment of a Cauchy Reed-Solomon erasure coding matrix calculation 300. The erasure coding calculation 300 comprises a matrix A 310, a matrix B 320, a matrix C 330, and operator (OP) 315. Matrix A 310 may be an index matrix with each element being binary, e.g., either a one or a zero. Matrix A 310 may be formed according to Cauchy Reed-Solomon coding principles as understood by a person of ordinary skill in the art. Matrix B 320 may represent raw data as stored in a container (e.g., container 120). Matrix B may be formed by dividing a container into an integer number of blocks, each of which form a sub-matrix of B. Sub-matrices of B are represented as $b_{ij}$ in FIG. 3. Matrix C 330 may be coded content which is the product of matrices A and B. OP 315 represents an operator which may be the same as the matrix multiplication, except that addition operations may be replaced by exclusive OR (XOR) operations. (An XOR is a binary operation known to a personal having ordinary skill in the art, wherein if x and y are binary numbers, the result of x XOR y is one if x and y are different and zero otherwise. If x and y are binary vectors of the same length, x XOR y yields a vector in which the number of ones is the number of differences between x and y.) These operations may take place in a DPG such as DPG 105 in FIG. 1. For example, matrix B may contain raw data in a container 120 in a server 110. A server, such as Server2 110, may divide the data into sub-matrices in matrix B. A coding matrix A may be applied to matrix B to obtain the encoded data in matrix C. After this operation, matrices B and C may be divided to be distributed over the servers 110 in a DPG 105. Matrix A may be a predefined matrix that indicates which row of B will participate in an XOR operation.

Figure 4:
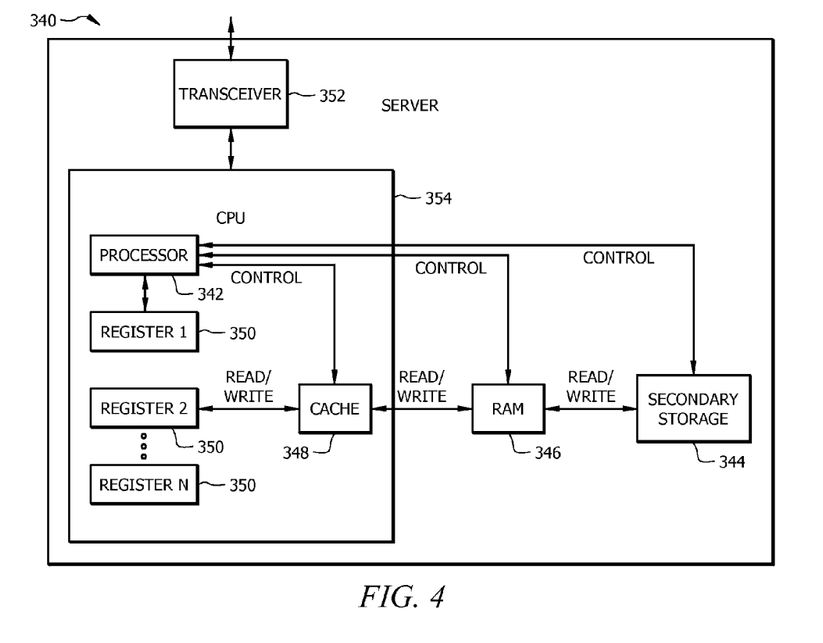
FIG. 4 shows an embodiment of a server architecture.

FIG. 4 is an architecture diagram of a server 340 suitable for implementing one or more embodiments of the components disclosed herein, such as storage servers 110 or location node 130. The server 340 comprises a central processing unit (CPU) 354, a random access memory (RAM) 346, a secondary storage device 344, and a transceiver (or transmitter/receiver) 352 configured as shown in FIG. 4. The CPU 354 comprises a processor 342, one or more registers 350 (the integer n in FIG. 4 may be any positive integer, such as a power of two), and a cache 348 configured as shown. Although illustrated as a single processor, the processor 342 may be implemented as one or more general purpose processors, cores (e.g., a multi-core processor), field-programmable gate arrays (FPGAs), application specific integrated circuits (ASICs), and/or digital signal processors (DSPs). The processor 342 may implement or be configured to perform any of the functionalities of DPGs, storage servers, or location nodes, such as all or part of the methods illustrated in flowcharts 200, 500, and 700. The processor 342 may be or comprise an arithmetic logic unit (ALU). The processor 342 may be in communication with the registers 350, cache 348, RAM 346, and secondary storage 344 at least in part to provide control of these elements.

The secondary storage 344 typically comprises one or more disk drives or tape drives and is used for non-volatile storage of data and as an over-flow data storage device if RAM 346 is not large enough to hold all working data. Secondary storage 344 may be used to store programs that are loaded into RAM 346 when such programs are selected for execution. Access to RAM 346 is typically faster than to secondary storage 344. Fast memory components (e.g., RAM 346) may be expensive, while cheaper memory such as a hard drive (e.g., secondary storage 344) is slower. There is a tradeoff in memory when choosing memory components in terms of cost and speed. This tradeoff is further expressed in the use of cache 348 and registers 350. The registers 350 provide the fastest memory access but at the greatest cost per unit of storage. Next in the speed/cost tradeoff is cache 348, which has slower memory access than registers 350 but at lower cost per unit of storage (however, cache is faster but more expensive than RAM 346 per unit of storage).

The cache 348 may be used to accommodate data in the CPU 354 during an erasure coding process. The cache 348 may store raw data and encoded data during aforementioned matrix calculations for erasure coding. Although only one cache is shown for illustration, there may be a plurality of caches (e.g., multi-level cache), with each one residing inside or outside the CPU 354. The registers 350 may be employed to provide fast memory for the processor 342. Furthermore, the cache 348 and registers 350 in FIG. 4 may be configured to take advantage of the enhancements disclosed herein. The cache 348 may be read from or write to any of registers 350.

The transceiver 352 may serve as an output and/or input device of the server 340. The transceiver 352 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The transceiver 352 may allow the processor 342 to communicate with an Internet, one or more intranets, one or more other servers, and/or a location node in a DPG.

Erasure coding may be enhanced with a single instruction, multiple data (SIMD) approach. As an alternative to conventional instructions, SIMD instructions (e.g., Intel Streaming SIMD Extensions), which may be supported by the CPU 354, may be implemented when performing XOR operations. The SIMD approach may be beneficial because it allows for the processing of multiple data bits in parallel, which may be conducted by a processor, such as processor 342.

Erasure coding may also be designed to be cache-friendly. For example, matrix B 320 may be 80 MB which exceeds a CPU's on-chip cache size (e.g., 1 MB). Matrix C 330 may be 20 MB, and matrix A 310 may be tens of kilobytes. In order to reduce the number of CPU data cache misses, matrices A through C may be divided into blocks. The sum of the size of A and each block or sub-matrix of B (e.g., b11) may be smaller than the on-chip cache (e.g., cache 348) that the CPU accommodates. The width of the blocks in B (e.g., the length of the row of b11, b12, . . . , b1n) may be determined by the cache line size (e.g., 16 to 256 bytes) and the size of the available registers, such as registers 350. After computing a1 and b11, the product of the two may be saved in matrix C. Thus, b11 may not need to be loaded into the CPU cache anymore.

For each row of the A block, the intermediate results may be stored into registers temporarily and later moved to matrix C after processing the whole row. For example, suppose the first row of matrix A has three elements, denoted as a1r11, a1r12, and a1r13. These elements may indicate which rows of b11 should be added together. For example, suppose a1r11, a1r12, and a1r13 are all ones, which indicates that all three rows in B11 should XOR together (meaning an XOR between two rows may be computed and the resulted XOR'd with the third row). There may be an availability of source registers (e.g., registers 350) which may be used to load the first row of b11 and store the results from the XOR operation. This step can be subsequently repeated for each row of b11. Finally, the contents of the source registers (e.g., registers 350) may be written to c11 in matrix C.

Further, an instruction level parallelism (ILP) technique may be implemented as an encoding enhancement. In ILP as much content as possible may be loaded into all the available SIMD registers (e.g., registers 350) before performing the XOR operations. For example, all or many of the rows of a data sub-matrix (such as b11 above) that are indicated as needing to be added together by matrix A could be loaded into the registers. An XOR of a plurality of pairs of rows may be performed in parallel (e.g., by a processor, such as processor 342). This may enable a CPU instruction level parallelism optimization because the loading and computing of each register does not interfere with each other. The total number of control instructions required (e.g., Intel instruction set instructions, such as compare (CMP) and jump instruction table (Jxx)) may be reduced by sharing.

The SIMD, cache-friendly, and ILP techniques disclosed above may work in conjunction with each other to optimize code. Furthermore, a minimum spanning tree based optimization technique may also be implemented. For example, when conducting the matrix calculation, the first element of matrix C 330's first row, C11, may be the product of matrix A 310's first row and matrix B 320's first column. Similarly, the first element of matrix C 330's second row, C21, may be the product of matrix A 310's second row and matrix B 320's first column. Due to the unique features of the XOR operation, C21 may also be computed from C11. This computation may additionally reduce the number of XORs. In order to determine a spanning tree, a graph may be defined with m+1 nodes, where m may be the number of rows in matrix A 310. Nodes N1 to Nm may correspond to each row of matrix A 310, and N0 may be an arbitrary starting point in a graph. Edges may be added between N0 to N1, N2, . . . , Nm. Each edge may be augmented to EN0Nx with the number of ones in the row which Nx represents. X may correspond to the specific row number. Next, the edges between all pairs among N1 to Nm may be added and augmented (e.g., EN1N2). The distance may be defined as the number of ones of the XOR product of the two rows which the end points represent (e.g., the number of ones in "Row1 XOR Row2"). That is, the distance is the number of differences between two rows. The minimum spanning tree may be computed from this defined graph. The tree may depict the most efficient route to calculate all elements in matrix C 330. Matrix A 310 may be readjusted according to the spanning tree, by rearranging A's row order and rewriting some elements (e.g., to indicate whether calculations should be performed from previously computed C rows). Thus, the total number of XOR operations may be minimal. After minimizing the number of XORs, the aforementioned erasure coding, SIMD, cache-friendly, and ILP techniques may be executed. The minimum spanning tree based optimization may be optional and may be done offline or only once during the system initialization stage. These erasure coding enhancements may be implemented by configuring components such as processor 342, cache 348, and registers 350 in the server 340.

Figure 5:
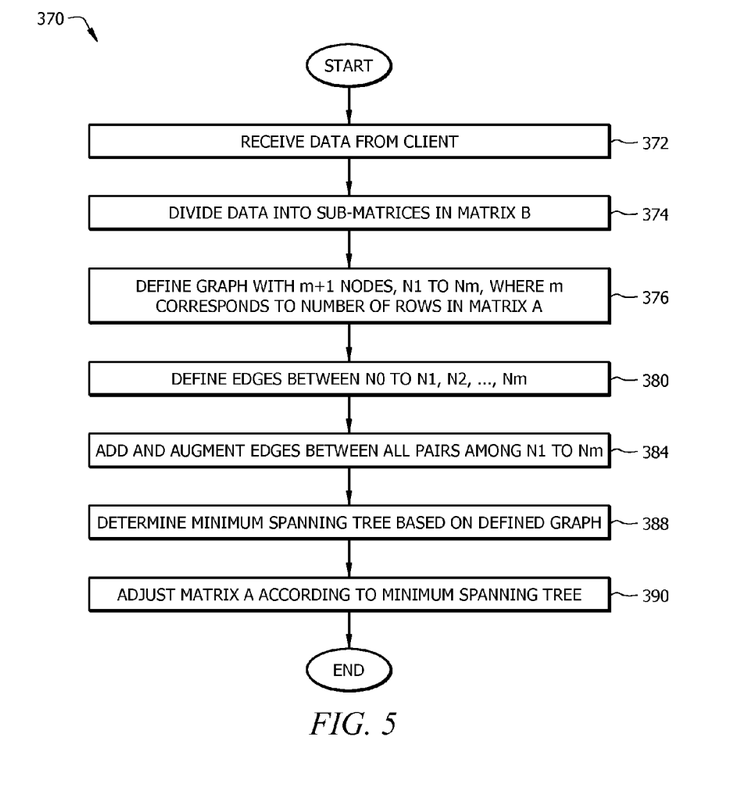
FIG. 5 is a flowchart of an embodiment of a minimum spanning tree based optimization.

FIG. 5 is a flowchart 370 of an embodiment of a method for minimum spanning tree based optimization. The steps of the flowchart 370 may be implemented in a server, such as in the server 340. Processor 342 in FIG. 4 may be configured to work with the cache 348, at least one register 350, and other memory components to perform the optimization method as understood by a person of ordinary skill in the art. The flowchart begins in block 372, in which a server may receive data from a client. The raw data may be separated in sub-matrices in matrix B (such as matrix B 320) at block 374. A graph with m+1 nodes, N1 to Nm, may be defined in block 376, in which m represents the number of rows in an index matrix A (such as matrix A 310). Node N0 may be set as the starting point in the graph. The method continues in block 380, where edges may be defined between nodes N0 to N1, N2, . . . , Nm. Edges may be augmented to EN1Nx with the number of ones in the corresponding rows. At block 384, the edges may be added and augmented between all the pairs among N1 to Nm. Each edge distance may be defined as the number of ones of the XOR product of the two rows indicated by the end points of the edge. At block 388, the minimum spanning tree may be determined as understood by a person of ordinary skill in the art based on the minimal distances observed in the defined graph. The rows and elements of matrix A may be rearranged in block 390 according to the minimum spanning tree to generate a new encoding matrix. The new encoding matrix may be used to encode the data matrix B using any of the techniques described herein.

Figure 6:
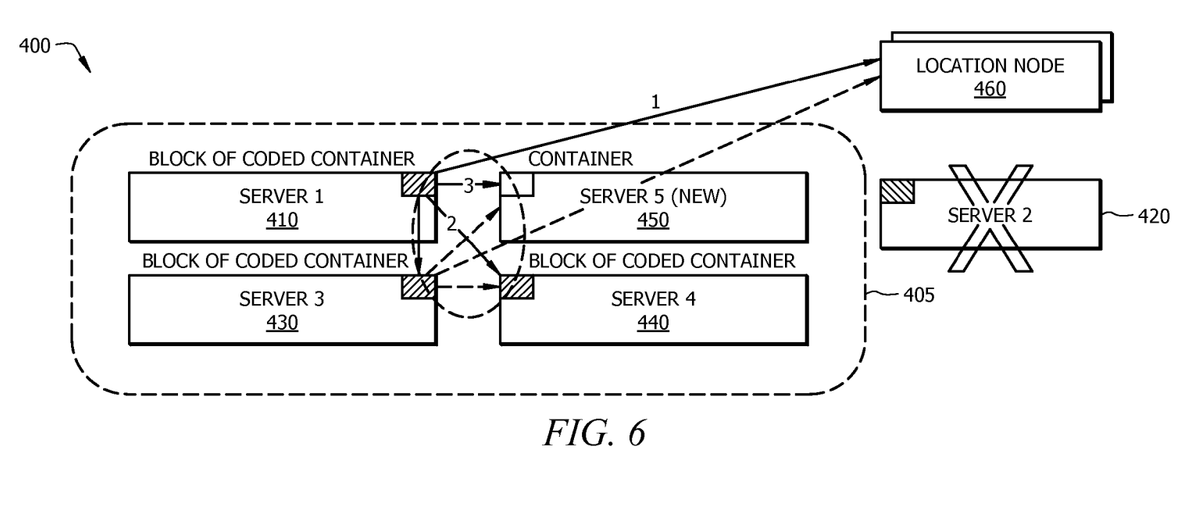
FIG. 6 illustrates an embodiment of parallel data recovery in DPG architecture.

FIG. 6 illustrates an embodiment of parallel data recovery in a DPG architecture 400. The architecture 400 may comprise a location node 460 and a DPG 405 comprising a plurality of storage servers, including Server1 410, Server2 420, Server3 430, and Server4 440. Server5 450 may be available as a spare server in case any of the servers 410-440 fail. In the event of a failure of a storage device (e.g., Server2 420), Server5 450 may join the DPG 405 as a replacement for the failed server. For the purposes of illustration, Server 2 420 is illustrated in FIG. 6 as having failed. The other peers in the DPG 405 may provide recovery assistance to Server5 450. For example, Server1 410 may check the location node 460 to obtain a list of the containers Server2 420 may have stored prior to failure (indicated by solid line 1). Server1 410 may then select a portion of the list (e.g., 10%) based on predefined rules. Server1 410 may then send requests to the other peers in the DPG 405 to fetch relevant coded blocks which may be used to restore specific containers (e.g., as represented by solid line 2). After fetching the coded blocks, Server1 410 may proceed to run erasure decoding. The restored containers are then sent to Server5 450 (indicated by solid line 3). These steps which are conducted by Server1 410 may be executed in parallel between other peers among the same DPG 405. As illustrated by the dotted arrows in FIG. 6, Server3 430 may carry out the same actions as described for Server1 410. Thus, the embodiment in FIG. 6 enables a parallel data recovery which improved efficiency by utilizing multiple servers simultaneously for recovery in the event of a storage failure. Although only three recovery assistant peers are shown in FIG. 6 for illustrative purposes, any number of recovery assistant peers may be configured to match the maximum write throughput that the new server may support.

Figure 7:
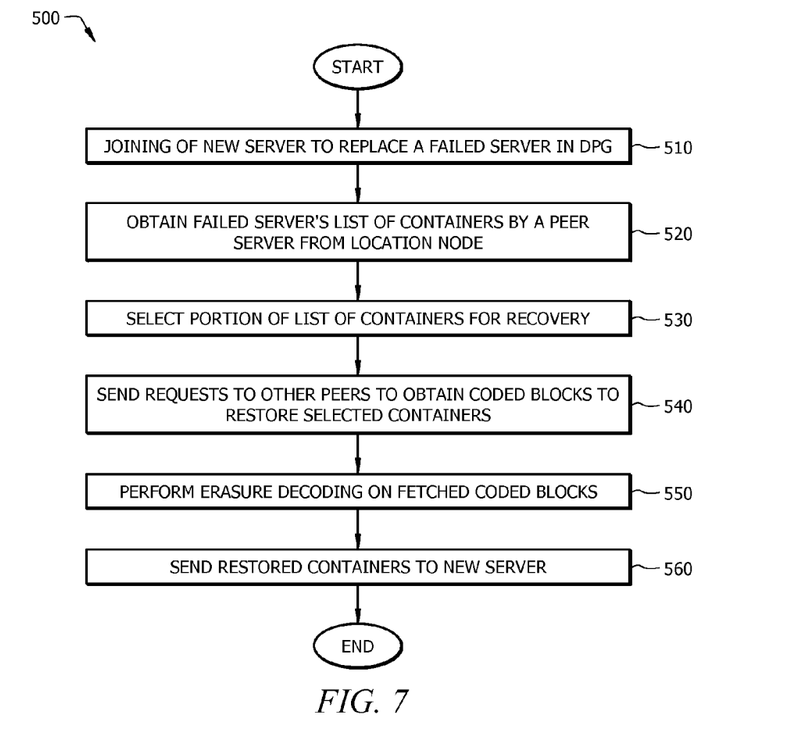
FIG. 7 is a flowchart of an embodiment of a parallel data recovery method.

FIG. 7 is a flowchart 500 of an embodiment of a parallel data recovery method. The steps of the flowchart 500 may be implemented in a data storage system with at least one DPG, a plurality of servers, and at least one location node. For example, the method flowchart may be performed in DPG 405 comprising location node 460 and a plurality of servers, including Server1 410, Server2 420, Server3 430, Server4 440, and Server5 450. The flowchart begins in block 510, in which a new server, such as Server5 450, may join a DPG to replace a failed server, such as Server2 420. At block 520, a peer server (e.g, Server1 410) may check a location node (such as location node 460) to obtain a list of containers that the failed server had previously stored. In block 530, the server may choose a portion of the list to recover based on predefined rules. Next, the server may send requests to other peer servers (e.g., Server3 430 and Server4 440) in the DPG in block 540 in order to acquire the coded blocks for restoration of the selected containers. After receiving the coded blocks that were fetched by peers, the method continues in block 550, in which the server may run erasure decoding. At block 560, the server may send the restored containers to the new server (such as Server5 450). The steps of this method flowchart 500 may be conducted in parallel by a plurality of servers in order to provide maximum throughput in recovery.

It is understood that by programming and/or loading executable instructions onto the server 340 in FIG. 4, at least one of the processor 342, the RAM 346, and the secondary storage 344 are changed, transforming the server 340 in part into a particular machine or apparatus, such as a location node or server, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A server configured to form part of a data protection group, wherein the server comprises:
   a memory;
   a transceiver configured to receive a request to store a data file from another device; and
   a processor coupled to the memory and the transceiver and configured to:
      acquire the request to store the data file,
      write the data file to a container in the memory; and
      encode contents of the container when the container becomes full to generate a plurality of encoded blocks,
   wherein the transceiver is further configured to:
      distribute the plurality of encoded blocks over peer servers in the data protection group.

2. The server of claim 1, wherein the transceiver is further configured to send a message to at least one location node to indicate that the server is responsible for data in the container.

3. The server of claim 1, wherein the server further comprises a cache, wherein the container contents forms a data block, and wherein encoding the container contents comprises:
   determine a size of a coding matrix;
   determine a size of a submatrix of the data block such that the sum of the size of the coding matrix and the size of the submatrix is smaller than the size of the cache;
   request that the submatrix of the data block and the coding matrix be written to the cache from the memory, wherein the cache is configured to store the submatrix of the data block and the coding matrix; and
   compute a portion of an encoded block by selecting and computing the exclusive or (XOR) of at least two rows of the submatrix of the data block, wherein the at least two rows are selected according to elements of a first submatrix of the coding matrix.

4. The server of claim 3, wherein encoding the container contents further comprises for each of a plurality of submatrices of the data block that are equal to or less than the submatrix in size, encoding the selected submatrix to generate the remainder of the encoded blocks.

5. The server of claim 1, wherein the encoding is Cauchy Reed-Solomon coding.

6. An apparatus comprising:
   a memory configured to store a data block and a coding matrix for encoding the data block;
   a cache; and
   a processor coupled to the cache and the memory, wherein the processor is configured to:
      determine a size of the coding matrix;

determine a size of a submatrix of the data block such that the sum of the size of the coding matrix and the size of the submatrix is smaller than the size of the cache;

request that the submatrix of the data block and the coding matrix be written to the cache from the memory, wherein the cache is configured to store the submatrix of the data block and the coding matrix; and compute a portion of an encoded block by selecting at least two rows of the submatrix of the data block and performing binary operations on the at least two rows, wherein the at least two rows are selected according to elements of a first submatrix of the coding matrix.

7. The apparatus of claim 6, further comprising a first register and a second register coupled to the processor, wherein computing a portion of the encoded block comprises:

retrieving a first row of the submatrix of the data block from the first register;

retrieving a second row of the submatrix of the data block from the second register, wherein the first row and the second row are selected according to elements of the submatrix of the coding matrix;

computing an exclusive or operation of the first row and the second row to produce a result; and storing the result in the first register.

8. The apparatus of claim 7, wherein the processor is further configured to:

retrieve a third row of the submatrix of the data block according to an element of the submatrix of the coding matrix;

compute an exclusive or (XOR) of the result and the third row to generate a second result; and write the second result to the first register.

9. The apparatus of claim 6 further comprising at least four registers coupled to the processor, wherein the at least two rows of the submatrix of the data block comprise at least four rows and are stored in the registers, and wherein the processor is further configured to perform an exclusive or (XOR) of all the at least four rows using single instruction multiple data (SIMD) operations.

10. The apparatus of claim 6, wherein the processor is further configured to:

for each of a plurality of submatrices of the data block that are equal to or less than the submatrix in size, encode the selected submatrix to generate the remainder of the encoded block.

11. The apparatus of claim 6, wherein the binary operations on the at least two rows comprises an exclusive or (XOR) of the at least two rows.

12. A server configured to form part of a data protection group, wherein the server comprises:

a transceiver configured to request a failed server's list of containers from at least one location node; and a processor coupled to the transceiver and configured to:

select a portion of the list of containers for recovery, wherein the transceiver is further configured to transmit a plurality of requests to a plurality of servers in the data protection group, and wherein the requests are collectively for all coded blocks corresponding to a container in the portion of the list.

13. The server of claim 12, wherein the transceiver is further configured to receive the coded blocks corresponding to the container, and wherein the processor is further configured to decode the coded blocks to generate data corresponding to the container.

14. The server of claim 13, wherein the transceiver is configured to transmit the data corresponding to the container to a second server that replaced a failed server in the data protection group.

15. The server of claim 12, wherein the processor is configured to coordinate with a plurality of servers in the data protection group to recover all the containers in the list.

16. A method comprising:

generating a graph comprising a starting node and a plurality of nodes, where each of the plurality of nodes corresponds to a different row of a coding matrix used to encode data in a container, wherein an edge from the starting node to each node in the plurality of nodes is a number of ones of the corresponding row of the coding matrix;

adding edges between all pairs of nodes in the plurality of nodes to the graph, wherein an edge from a first node to a second node in each pair of nodes in the plurality of nodes is the number of differences between the corresponding two rows of the coding matrix;

determining a minimum spanning tree from the graph; and adjusting the coding matrix based on the minimum spanning tree.

17. The method of claim 16, wherein adjusting the coding matrix comprises rearranging the row order of the coding matrix according to cost based on the minimum spanning tree to generate a new coding matrix.

18. The method of claim 17, further comprising:

encode a data block to generate encoded content using the new coding matrix.

19. The method of claim 18, wherein using the new coding matrix to encode a data block comprises:

determining a size of a coding matrix for encoding a data block;

determining a size of a submatrix of the data block such that the sum of the size of the coding matrix and the size of the submatrix is smaller than the size of a cache;

requesting that the submatrix of the data block and the coding matrix be written to the cache from a memory, wherein the cache is configured to store the submatrix of the data block and the coding matrix; and compute a portion of an encoded block by selecting at least two rows of the submatrix of the data block and performing binary operations on the at least two rows, wherein the at least two rows are selected according to elements of a first submatrix of the coding matrix.

20. The method of claim 16, further comprising generating the coding matrix for Cauchy Reed-Solomon encoding.

* * * * *